United States Patent Office 2,767,069
Patented Oct. 16, 1956

2,767,069

ANHYDRIDES OF HETEROCYCLIC BORON COMPOUNDS

Philip S. Fay, Lyndhurst, and Lorraine S. Szabo, Cleveland, Ohio, assignors to The Standard Oil Company, Cleveland, Ohio, a corporation of Ohio No Drawing. Application September 16, 1954, Serial No. 456,614

2 Claims. (Cl. 44—63)

This invention relates to a method introducing organic boron compounds into gasoline and, more particularly, to the introduction of certain heterocyclic compounds containing boron, oxygen and carbon in the ring, and in which boron is attached only to oxygen.

Organic compounds of boron, if they are stable under many conditions of use, are of relatively high molecular weight and have a relatively low boron content. As such they are not adapted for uses where their suitability is in proportion to their boron content. The boron-containing anhydrides employed in the invention have the advantage of a relatively high boron content, and the ability to react with water to form esters that are exceptionally stable. These esters are particularly resistant to oxidation and to hydrolysis to form boric acid upon exposure to water, a property not possessed by the common organic esters of boric acid, such as, for example, tertiary butyl borate. These esters are also moderately soluble in hydrocarbons, as well as water, permitting a wider variety of uses. Neither the anhydrides nor the esters formed therefrom result in gasoline insoluble compounds upon exposure to water or moist air as do most boron compounds, and the anhydrides can be used as additives in gasoline and other hydrocarbons.

The anhydrides employed in the invention are especially adapted for use in compositions in which it is desirable to introduce boron, and at the same time, remove water therefrom. In gasoline, for example, a small amount of water is usually present as a result of washing the gasoline during manufacture. This water in the gasoline causes carburetor icing problems and fuel line freezing in cold weather. The addition of our anhydrides to such gasoline removes or lessens the water content thereof as a result of the reaction of the water with the anhydride, and the resulting boron ester is soluble in the gasoline and provides the boron content that is desirable for promoting enhanced engine performance.

The compounds employed in the invention may be defined by the following structural formula:

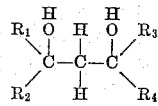

where $R_1$, $R_2$, $R_3$, and $R_4$ may each be hydrogen or an alkyl radical of 1 to 6 carbon atoms, preferably the methyl group.

Compounds within the scope of our invention are as follows:

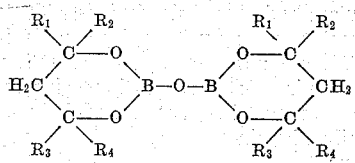

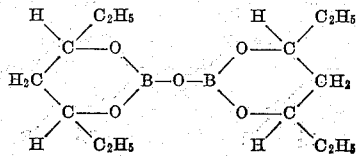

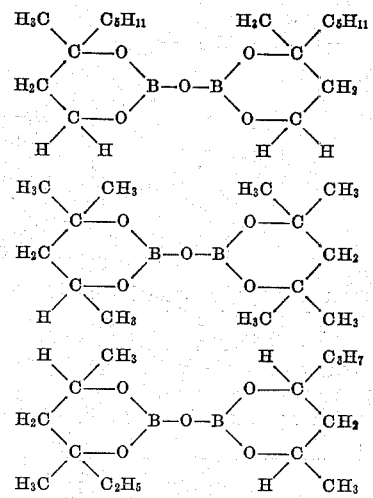

The compounds employed in the invention may be made by reacting the corresponding glycol having the formula $$\begin{array}{c} \text{H} \quad \text{H} \\ R_1 \quad \text{O} \quad \text{H} \quad \text{O} \quad R_3 \\ \diagdown \diagup \quad | \quad \diagdown \diagup \\ \text{C}-\text{C}-\text{C} \\ \diagup \quad | \quad \diagdown \\ R_2 \quad \text{H} \quad R_4 \end{array}$$

where $R_1$, $R_2$, $R_3$, and $R_4$ are defined as heretofore, with an equal molar amount of orthoboric acid ($H_3BO_3$). The materials are reacted at mildly elevated temperatures, and the two and one-half moles of water of reaction are removed or the product otherwise separated from the water of reaction. Boric acid ($B_2O_3$), which is the anhydride of orthoboric acid, in half the molar amount, to form one mole of water of reaction, can be used in place of orthoboric acid and is the equivalent thereof. The water of reaction is usually separated by overhead removal of the water, such as by blowing with nitrogen or by distillation. All of the water can be removed by simple boiling. However, because of the low boiling point of the reaction product a certain amount of it will be lost by volatilization during the removal of the water. The elimination of the water is aided by blowing with an inert gas, although in this procedure there is still some loss of the product. For this reason it is preferred to remove the water by fractional distillation or by azeotropic distillation which lowers the temperature at which the water can be removed and minimizes product loss. Fractionation can also be used in the azeotropic distillation. The reaction proceeds readily and without any of the difficulties normally attributed to reactions of this type.

The invention will be better understood in connection with the following example in which the glycol is 2-methyl, 2,4-pentanediol, i. e., a compound in which $R_1$, $R_2$, and $R_3$ are a methyl group and $R_4$ is hydrogen.

*Example I*

49.5 grams of dry orthoboric acid and 94.5 grams of 2-methyl, 2,4-pentanediol (a 1:1 molar ratio) were mixed together. Upon mixing, the temperature dropped approximately 8 to 10° C., and upon additional stirring, the temperature then rose rapidly to and slightly above the initial temperature, at which time the mixture became solid. The mixture was then heated and became completely liquid at about 70 to 75° C. 100 cc. of benzene was added and the water formed was removed azeotropically by distillation with the benzene over a period of several hours. The reaction proceeds in accordance with the following equation:

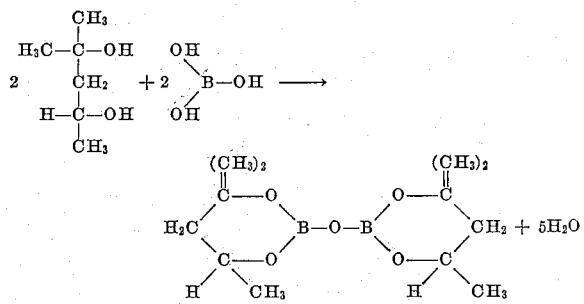

and the product may be named bis-(1,1,3-trimethyltrimethyleneoxy) boric oxide. The compound of this example was found to be a colorless liquid of medium viscosity. It is miscible in hydrocarbons, and particularly in gasoline, and the common organic solvents in all proportions. It has the following additional properties:

Boiling point _____ Approximately 275° C. at atmospheric pressure and 140–142° C. at 1 mm. Hg.
$n_D^{25}$ _____ 1.4310.
Molecular weight __ Calculated 269.9, found 246.5.
Percent boron _____ Calculated 8.01, found 7.41.

The boron determination was made by titration with mannitol, and the molecular weight was done cryoscopically in benzene. Infra red analysis confirmed the absence of the hydroxyl group, and repetition under conditions permitting recovery of the water of reaction showed that two and one-half moles of water were formed for each mole of glycol and boric acid reacting.

The above compound was twice distilled at a pressure less than 1 mm. Hg. The narrow boiling heart cut was submitted to analysis. The following composition was found:

| Percent | Calculated | Found by Analysis |
|---|---|---|
| Carbon | 53.39 | 53.42 |
| Hydrogen | 8.96 | 9.02 |
| Boron | 8.01 | 7.79 |

The liquid anhydride product is very hydroscopic and readily reacts with water to form a white crystalline solid ester. Upon exposure of the anhydride to air the atmospheric moisture will hydrolyze the anhydride to this solid ester which has the following formula:

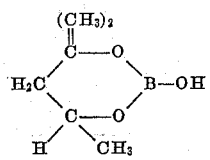

and may be named 1-hydroxy, 3,3,5-trimethyl, 1-bora, 2,6-dioxacyclohexane or 1,1,3-trimethyltrimethylene acid borate. The ester has a solubiilty of 11 grams in 100 grams of water, 58 grams in 100 grams of benzene, 156 grams in 100 grams of isopropanol, and about 2½ to 5 grams in 100 grams of gasoline, depending upon the composition of the latter, all as measured at 86° F.

The ester was analyzed and found to have the following composition:

| | Calculated | Found by Analysis |
|---|---|---|
| Percent Carbon | 50.05 | 50.01 |
| Percent Hydrogen | 9.10 | 9.21 |
| Percent Boron | 7.52 | 7.43 |
| Molecular Weight | 143.97 | 155 |

While the anhydride reacts readily with water, the ester formed is resistant to hydrolysis and soluble in hydrocarbons and many organic solvents.

*Example II*

52 grams pentane diol-2,4 is reacted with 31 grams of dry orthoboric acid under conditions the same as that in the previous example. The product was a clear, colorless, viscous liquid having a boiling point of 114° C. at 1 mm. Hg. It has the formula

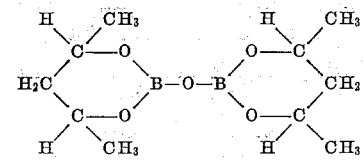

The yield was 61 grams which was vacuum distilled at 1 mm. Hg to give a yield of 55.8 grams. The compound reacts with water to give a product that is crystalline solid, having a melting point of 76° C. and which has the formula

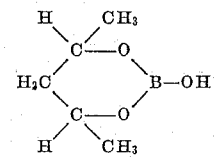

Gasoline solutions containing up to 3 cc. per gallon of tetraethyl lead and to which all of the above anhydrides had been added in an amount to provide 0.002 to 0.1% boron were stored in open beakers in a moist desiccator for several months. No crystals were formed, and analysis of the gasoline before and after the test showed the boron content to be the same. No precipitation occurred when the samples were stored at −10° F. for several months.

A specific use of the above anhydrides will be illustrated in connection with gasoline which has been washed with water following conventional caustic treatment. To this gasoline was added 1½ cc. of tetraethyl lead per gallon and one theory of ethylene dibromide as a scavenging agent for the lead, together with enough of the compound of Example I to provide 0.004% boron in the above gasoline mixture. The addition of the compound removed enough of the water in the gasoline to eliminate cloudiness at freezing temperatures.

We are aware of the fact that it has been proposed to react glycols with boric acids in which the ratio of glycol is higher, such as 3:2 or 2:1. Such reactions link carbon through oxygen to all of the boron valences and give compounds that have a lower boron content for a given glycol, a distinct disadvantage for uses where the amount of the compound required is expressed in terms of boron. These compounds do not hydrolyze readily to eliminate moisture from the compositions to which they are added, and if they are hydrolyzed slowly it is with the liberation of the glycol which may be objectionable in many instances. We are not aware of the reaction of glycols with boric acid in a 1:1 molar ratio to give compounds of the formula claimed hereinafter and having the advantages described herein.

We claim:

1. The method of introducing a boron compound into gasoline and removing water therefrom, which comprises adding to a water-washed and water-containing gasoline an anhydride having the following general formula:

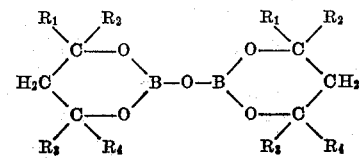

where $R_1$, $R_2$, $R_3$, and $R_4$ are selected from the group consisting of hydrogen and an alkyl group having 1 to 6 carbon atoms, which anhydride reacts with water dissolved in the gasoline to form the corresponding ester and eliminate cloudiness in the gasoline at freezing temperature.

2. The method of introducing a boron compound into gasoline and removing water therefrom, which comprises adding to a water-washed and water-containing gasoline an anhydride having the following formula:

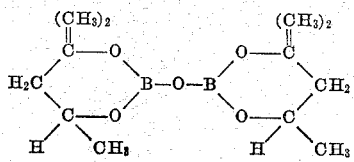

which compound reacts with water dissolved in the gasoline to form the corresponding ester and eliminate cloudiness in the gasoline at freezing temperature.

References Cited in the file of this patent

UNITED STATES PATENTS

| | | |
|---|---|---|
| 2,151,432 | Lyons et al. | Mar. 21, 1939 |
| 2,255,515 | Popper | Sept. 9, 1941 |
| 2,257,194 | Rosen | Sept. 30, 1941 |
| 2,312,208 | Clayton et al. | Feb. 23, 1943 |
| 2,497,521 | Trautman | Feb. 14, 1950 |
| 2,642,453 | Lippincott | June 16, 1953 |
| 2,692,191 | Haskell | Oct. 19, 1954 |

FOREIGN PATENTS

| | | |
|---|---|---|
| 722,537 | Great Britain | Jan. 26, 1955 |